March 21, 1933.  T. J. ROBBINS  1,902,666
PORTABLE ICE SAW
Filed March 10, 1932   2 Sheets-Sheet 2
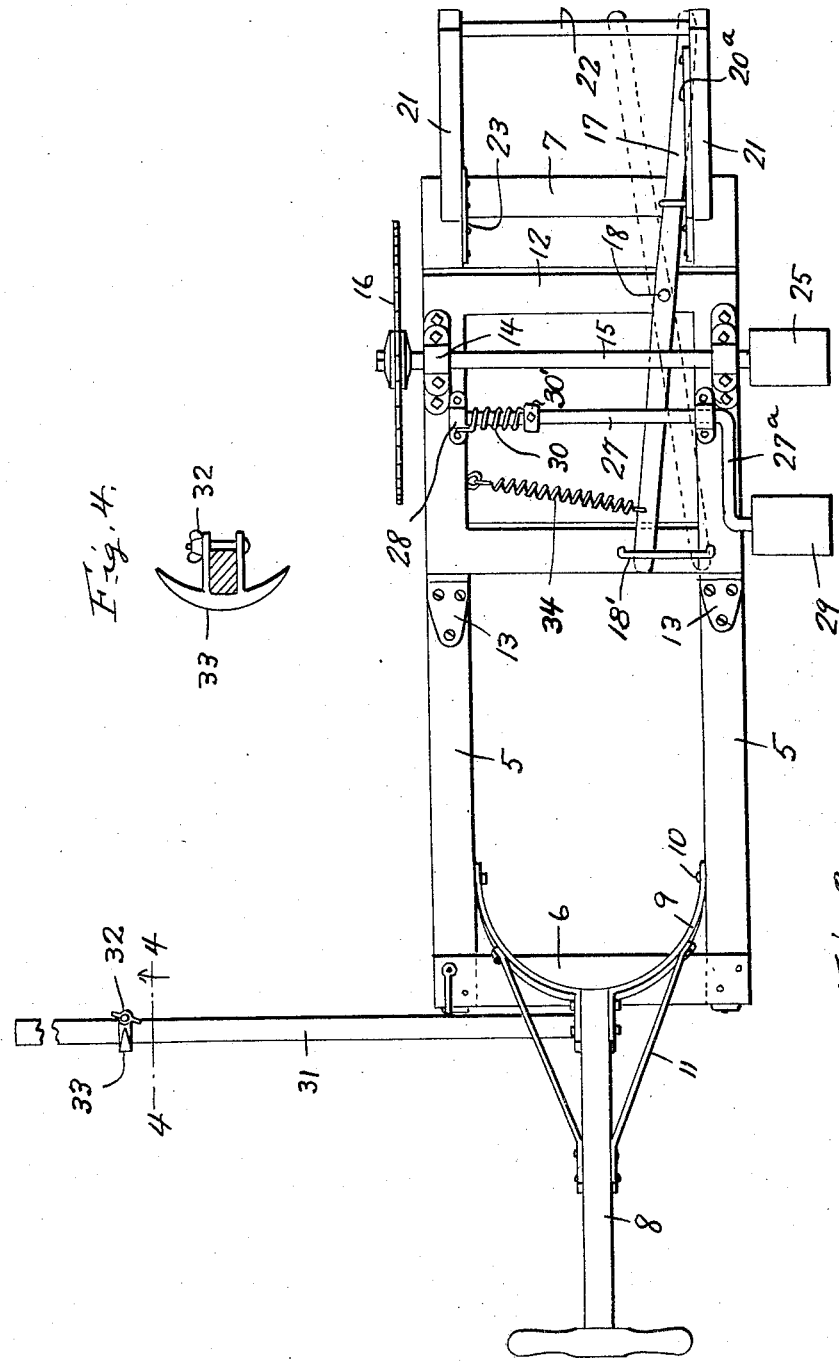
Inventor
Theodore J. Robbins
By Clarence A. O'Brien
Attorney Patented Mar. 21, 1933

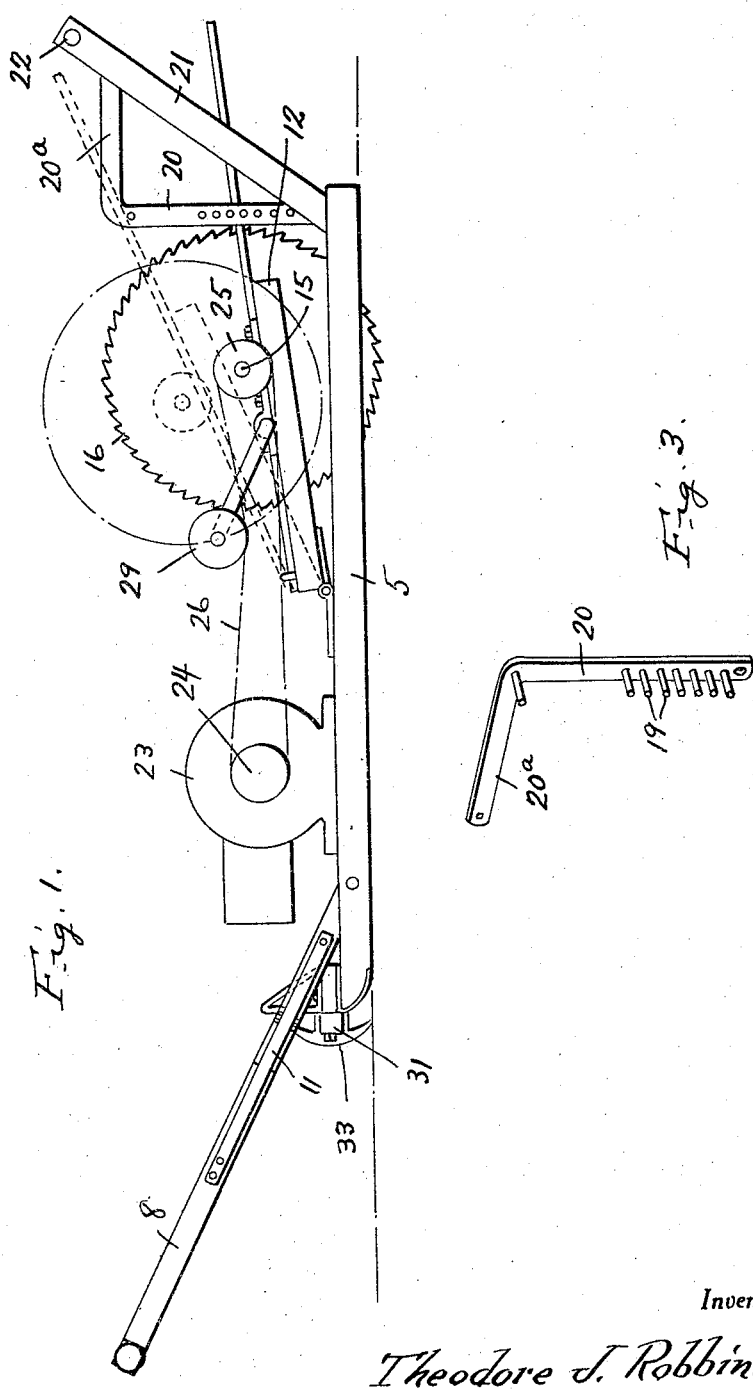

1,902,666

UNITED STATES PATENT OFFICE

THEODORE J. ROBBINS, OF NEW EGYPT, NEW JERSEY

PORTABLE ICE SAW

Application filed March 10, 1932. Serial No. 598,063.

The invention relates to saws for cutting ice, and in accordance with the present invention a saw for this purpose is provided which may be readily drawn over the frozen surface of the lake, pond or the like for scoring the ice into blocks.

The invention comprehends the provision of a power driven saw which is equipped with runners to facilitate travel of the device over the ice.

Further, an ice saw embodying the features of the present invention is provided with means for adjusting the cutting depth of the saw.

The invention together with its numerous objects and advantages will be best understood from a study of the following description, taken in connection with the accompanying drawings wherein:

Figure 1 is a side elevational view of the saw, the cutter or saw per se being shown in two positions.

Figure 2 is a top plan view of the device, the prime mover being removed.

Figure 3 is a perspective view of a pin equipped bar.

Figure 4 is a sectional view taken substantially on the line 4—4 of Figure 2 and looking in the direction of the arrows.

Referring more in detail to the drawings, it will be seen that my improved saw comprises a pair of runners 5, 5 connected at their ends by cross bars 6 and 7. For pulling the device along there is provided a handle 8 at the front end of the device that is provided at one end with oppositely extending arcuate fork members 9 pivoted as at 10 to the runners 5. The handle 8 is braced with respect to the members 9 through the medium of brace rods 11.

Disposed adjacent the rear end of the runners is a frame 12 that is hinged at its forward end to the runners 5 intermediate the ends of the runners as at 13. Bearings 14 are provided at opposite sides of the frame 13 and support a shaft 15 on one end of which is suitably mounted a circular saw 16.

For disposing the saw 16 at the desired adjustment to thereby control the cutting depth thereof there is provided a lever 17 pivoted intermediate its ends to the rearward most frame member of frame 12 as at 18. One end of the lever 17 operates in a guide 18' provided on the frame 12 while adjacent its rear end the lever 17 is adapted to be engaged with a selected one of a vertical series of relatively spaced pins 19 provided on a vertical post 20 rising from one of the runners 5 at the rear end of the latter.

To aid in propelling the device over the ice surface, there is provided at the rear of the device a suitable handle consisting of bars 21 extending upwardly and rearwardly from the runners 5 and connected at their upper ends by a handle bar 22. One of the posts or bars 21 is braced with respect to an adjacent runner 5 through the medium of a brace bar 23 while the other of the bars or posts 21 is braced with respect to the adjacent runner 5 through the medium of the post 20 which at its upper end is provided with an angular extension 20a bolted or otherwise secured at its free end to the upper portion of said bar or post 21 as suggested in Figure 2.

Supported between the forward ends of the runners 5 in any suitable manner is a prime mover 23 which may be in the nature of a gasoline motor, electric motor or the like, and the same has a pulley 24 driven directly therefrom. Pulley 24 is connected with a pulley 25 on the shaft 15 through the medium of an endless belt 26.

A shaft 27 is journalled in bearings 28 provided on opposite members of the frame 12, and the shaft 27 is provided at one end with a crank arm 27a on which is arranged an idler or take up pulley 29 that engages the upper run of the belt 26 and provides means for taking up slack in the belt. Shaft 27 is normally urged to rotate in an anticlockwise direction through the medium of a spring 30 disposed about the shaft, one end of the spring being connected with the proximate bearing 28 while the other end of the spring is suitably engaged with a collar 30' fixed on the shaft 27 and shown in Figure 2.

Suitably mounted adjacent the forward end of the runners and extending laterally of the device is a scribe arm 31 which has adjustably mounted thereon at 32 a scriber 33. The scriber 33 is adapted to travel in the cut previously produced by the machine so as to insure the second cut being parallel with the first cut.

In actual practice the device is drawn over the ice, one person pulling the device at the front through the medium of the handle 8, and another pushing the device through the medium of the handle 22 at the rear. To adjust the cutting depth of the saw 16 lever 17 is swung to the dotted line position shown in Figure 2 and the frame 12 is then swung about the pivot formed by the hinges 13 either to a raised or lowered position, after which lever 17 is subsequently engaged with the proper pin 19 for retaining the frame at the desired adjustment. Lever 17 is retained in its full line position, that is in engagement with a pin 19, through the medium of a spring 34 that connects the forward end of the lever 17 with the side member of the frame 12 farthest remote from the guide 18'.

Even though I have herein shown and described the preferred embodiment of the invention, it is to be understood that the same is susceptible of further changes, modifications and improvements coming within the scope of the appended claims.

Having thus described my invention, what I claim as new is:

1. In an ice saw, a pair of spaced parallel runners, a pulling handle connected to the forward ends of the runners, a pushing handle connected to the rear ends of the runners, a frame hinged at one end to said runners intermediate the ends of the latter, a shaft journalled on said frame transversely thereof, a cutting implement on one end of said shaft, a lever pivoted intermediate its ends to the free end of said frame, a guide in which one end of said lever operates carried by the frame adjacent the hinged end thereof, a standard rising from one of said runners adjacent the rear end thereof and provided with a vertical series of spaced pins with which the other end of said lever is engageable for securing said frame at the desired adjustment to control the cutting depth of said cutting implement, belt drive means for driving said shaft, a second shaft journalled on said frame transversely thereof, spring means normally urging said second shaft to rotate in one direction, and a belt slack take up pulley on one end of the second shaft; and spring means anchored at one end to said frame and at its other end engaged with said lever for normally urging the same to rotate in one direction.

2. An ice saw comprising in combination a pair of spaced parallel runners, a bar supported on the runners adjacent the forward ends thereof, a scriber adjustably mounted on the bar laterally of said runners, a frame hinged at one end to said runners rearwardly of said bar, a shaft rotatably mounted on said frame, a cutter mounted on said shaft laterally of said frame and runners, driving means for said shaft, a standard rising from one of said runners rearwardly of said frame, a lever pivotally secured to said frame, and a vertical series of spaced elements on said standard and with which said lever is engageable for securing said frame at the desired angular adjustment relative to the plane of said runners.

In testimony whereof I affix my signature.
THEODORE J. ROBBINS.